United States Patent Office.

JAMES GOULD, OF LEXINGTON, MASSACHUSETTS.

Letters Patent No. 95,403, dated September 28, 1869.

---

IMPROVED PAINT-COMPOUND.

---

The Schedule referred to in these Letters Patent and making part of the same.

---

*To all to whom these presents shall come:*

Be it known that I, JAMES GOULD, of Lexington, in the county of Middlesex, and Commonwealth of Massachusetts, have made an invention of a new and useful composite liquid or material, which I term Carbolic Chemical Paint; and do hereby declare the following to be a full, clear, and exact description of the nature, use, and advantages of my invention, such description being sufficiently lucid and extended to enable others skilled in matters to which it appertains, to prepare and apply it.

In conducting the repeated and elaborate experiments, which have ended in the invention herein described, and which constitutes the subject-matter of this patent, my object has been to produce a compound, in liquid form, which shall constitute a lasting and effective paint for the walls of buildings, as a fire and water-proof covering to roofs, and other objects, as an efficient protection for ships' bottoms, or the structure exposed to the action of salt water, and lastly, as an excellent water-proof cement for various purposes for which such cements are employed; one great feature in my invention being the extreme low cost of producing it, inasmuch as it may be compounded at an entire cost of less than two dollars per barrel.

Under some conditions, and in its fine state of manufacture, this compound will be found to answer admirably for painting the interior of structures, though it is mainly intended for exterior use.

The principal and vital ingredients of my compound and their proportionate percentage are approximatingly as follows:

Twenty per cent. dead-oil. This substance condenses in the mains of gas-works, and contains naphthaline and bituminous fluids, the former in excess.

Twenty per cent. gas-lime, another refuse of gas-works, which consists of carbolate of lime and sulphate and sulphite of lime, the former greatly in excess.

Twenty per cent. coal-ashes. These ashes are composed of silica, aluminum, oxide of iron, and some unconsumed carbon, the iron in them peroxidized by exposure to the atmosphere, constituting from twenty to fifty per cent. of the whole, according to the nature of the ashes, whether white or red-ash.

Fifteen per cent. common clay.

Fifteen per cent. oyster-shells, ground, or same ratio of carbonate of lime from ground limestone, marble, or chalk.

Five per cent. salt, introduced in form of salt water, either natural or artificial, the latter including new or spent brine.

Briefly and primarily the dead-oil, iron, and salt produce a semi-adhesive, hard, fire-proof composition; the clay contributes body and smoothness; and the oyster-shell or carbonate of lime, lightens in color; while the carbonate of lime contained in the gasoline, produces acrid and adhesive action upon the combination.

Secondarily, various coloring-pigmentaries and other agencies are adopted, which will be duly explained.

The process and preparation are as follows:

First. First place within a suitable caldron, twenty per cent., approximatingly, of dead-oil, diluted very thin with salt water, natural or artificial, and boil together one-half hour or thereabout, the resulting liquid being a light brown color, approaching yellow. About ten per cent. each, of coal-ashes and clay, is added, and the mass thoroughly agitated to effect an intimate union or mixture.

The caldron is now removed from the fire, and the other ingredients, in original proportion, as first stated, are added to the compound, and the whole thoroughly stirred and incorporated.

The resulting mass, when cold, will be of the consistency of common house-paint, and may or not be combined with fish or other oil, to increase its brilliancy of surface, when applied to the interior of a structure.

Upon application, and exposure to the atmosphere in a thin film, as with common paint, the water evaporates; while the dead-oil and lime rapidly harden, and oxidation rapidly ensues, leaving a body which sun or rain, heat and cold alike fail to injuriously affect.

The compound, produced as above, may be colored by various earthy or metallic pigments, such as yellow and red ochres, or any inexpensive coloring-agents, while its color may be lightened or whitened by the employment, in addition to the oyster-shells, of carbonate of lime, before alluded to, of white lead, or zinc, or an analogous substance.

As the ochres contain a very preponderating percentage of peroxide of iron, their incorporation into the mass, has a value in addition to their coloring-properties.

I would remark that the clay, before mentioned, may be omitted, and its proportionate percentage replaced by coal-ashes, without violating the chemical or constituent combination of my invention.

The compound, as above, may be converted into an effective and valuable water-proof cement, by increasing density to the proper extent.

When employed as a protection to the bottoms of navigable vessels, or other structures or objects exposed to the action of salt water, I add to my compound, ground scale of oxide of copper, a well-known poison to worms and barnacles.

A compound material, composed of ingredients and under the process as herein described, possesses many advantages, and is susceptible of varied and extended application:

For making structures of various character, water-tight and fire-proof.

For painting the exterior, and in many cases the interior of dwellings and other habitations or buildings.

It will adhere with great tenacity to whatever substance it is applied, and will not crack with age or exposure to the elements, even in very sudden changes.

Owing to the nature of the iron which enters into its composition, it becomes very lasting, while, in addition to the above valuable qualities, among a great number which might be enumerated, its extreme low cost would alone establish its value.

I claim as my invention, and desire to secure by Letters Patent of the United States—

The improved composite material, compounded of ingredients and under the process hereinbefore set forth and explained.

JAMES GOULD.

Witnesses:
FRED. CURTIS,
EDWARD GRIFFITH.